United States Patent Office 3,631,052
Patented Dec. 28, 1971

3,631,052
DERIVATIVES OF 5,11-DIHYDRODIBENZ
[b,e][1,4]OXAZEPINE
Harry Louis Yale, New Brunswick, N.J., assignor to E. R.
Squibb & Sons, Inc., New York, N.Y.
No Drawing. Filed Feb. 12, 1970, Ser. No. 10,982
Int. Cl. C07d 29/28
U.S. Cl. 260—293.58       10 Claims

ABSTRACT OF THE DISCLOSURE

New derivatives of 5,11-dihydrodibenz[b,e][1,4]oxazepine and salts thereof, which are effective in relieving anxiety without other central depressant effects, have the structural formula.

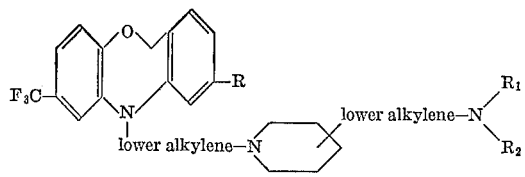

BACKGROUND AND SUMMARY OF THE INVENTION

U.S. Patent 3,069,432, issued Dec. 18, 1962, describes a group of 5,11-dihydrodibenz[b,e][1,4]oxazepine derivatives which may be used in the treatment of depressed psychotic states and as antihistamines. It has been found that a particular group of new 5,11-dihydrodibenz[b,e][1,4]oxazepine derivatives, which bear some structural similarities to some members of that group of compounds, have the particular properties of relieving anxiety with the especial advantage that increasing anti-anxiety effects are observed as the dose is increased yet other central nervous systems effects, e.g., depression, do not occur as in the case of known compounds.

The new compounds have the formula (I)

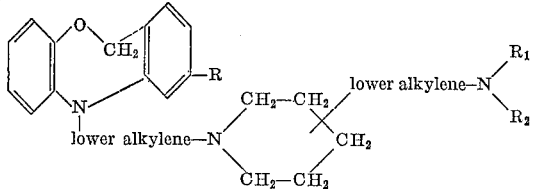

R in Formula I represents hydrogen or halogen. $R_1$ and $R_2$ each represent hydrogen, lower alkyl or alkanoyl of up to about eleven carbons.

Acid addition salts of these compounds are also within the scope of this invention.

DETAILED DESCRIPTION OF THE INVENTION

All four halogens, in addition to hydrogen, are represented by R in Formula I, but chlorine and bromine are preferred, especially the former. The lower alkylene groups are straight or branched chain aliphatic hydrocarbon groups having one to seven carbon atoms in the chain. In the case of the lower alkylene group linking the piperidine to the nitrogen of the oxazepine ring, it is preferable to have four or less carbons, especially three. In the other lower alkylene chain up to four carbons are preferred, especially one.

$R_1$ and $R_2$ each represent hydrogen, which is preferred, as well as one to seven carbon lower alkyl groups, preferably those having three or less carbons, and one to eleven carbon alkanoyl groups, with preference for lower alkanoyl, e.g., up to seven carbons, especially heptanoyl, as well as those having three or less carbons.

Particularly preferred are those compounds of Formula I wherein X, $R_1$ and $R_2$ each is hydrogen and the lower alkylene groups each has three or less carbons, especially three in the chain linking the nitrogen atoms and one in the chain linking the group

to the piperidine ring. Although the

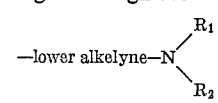

group may be linked to any carbon of the piperidine ring, the position para to the nitrogen is preferred. A particularly preferred group has the formula (II)

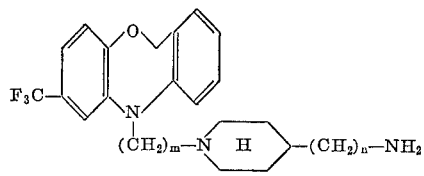

wherein m and n each is 1, 2 or 3.

The new products of Formula I may be produced by reacting an alkylene dihalide of the formula (III)

hal-alkylene-hal with a compound of either Formula IV or Formula V

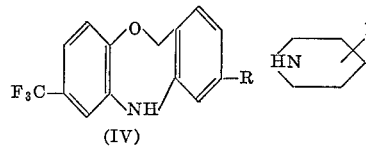

and the product of this reaction is then reacted with the other of the two above structures. The option of first alkylating the compound of Formula V is a preferred alternative only when $R_1$ and $R_2$ are both other than hydrogen.

Thus, for example, a compound of Formula IV is reacted with an alkylene dihalide such as trimethylene chlorobromide, ethylene chlorobromide or the like to form an intermediate of the formula (VI)

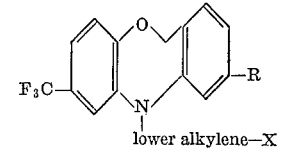

wherein R is a halogen as defined above and X is a halogen, preferably chlorine or bromine.

This reaction may be effected in an organic solvent, preferably a ketone such as acetone, methyl ethyl ketone, methyl n-propyl ketone, methyl isobutyl ketone or the like, at about the reflux temperature of the solvent, e.g., within the range of about 55° to 115°, preferably about 75° to 85° C.

The intermediates of Formula VI is then made to react with a compound of Formula V in a ketone solvent under conditions such as those described above. Preferably at this stage, an alkali metal iodide like sodium iodide is present in an amount approximately equimolar with VI.

As an alternative, an alkylene dihalide of the type referred to above may be made to react with a compound of Formula V, wherein $R_1$ and $R_2$ are both other than hydrogen, to form an intermediate of the formula (VII)

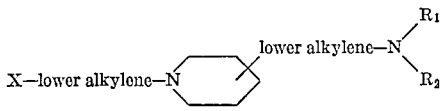

This reaction may be effected in an organic solvent like methylene chloride, chloroform, benzene or the like at a low temperature, e.g., in the range of about 0° to 20° C. The product of this reaction normally precipitates as a hydrohalide salt. After separation, the base may be liberated from the salt, e.g., by neutralization with a base such as sodium hydroxide, potassium hydroxide or the like.

The intermediate of Formula VII then will react with the other, non-alkylated compound of Formula IV in a ketone solvent as described previously. A hydrogen halide acceptor like sodium hydroxide may be present.

The compounds of Formula IV are produced by the method described in U.S. Pat. 3,069,432, supra.

The compounds of Formula V may be obtained by the method described in Chemical Abstracts 64, 19602a (1966) from pyridine alkanoic acids, described in the review "Pyridine and Derivatives," Part 3 (Interscience Publishers, 1962), pages 179 to 507, which have been conventionally catalytically hydrogenated to the piperidine alkanoic acids. In the case of such compounds wherein $R_1$ and/or $R_2$ is other than hydrogen, an alkylation with an $R_1$, $R_2$-halide may be inserted prior to the two separate reductions with lithium aluminum hydride and hydrogen and Raney nickel.

To prepare compounds of Formula I wherein $R_1$ is a lower alkanoyl group and $R_2$ is hydrogen or lower alkyl, a compound of Formula I wherein $R_2$ is hydrogen or lower alkyl is warmed with one equivalent of formic acid or a lower alkanoyl halide up to about 60° C. To obtain a product of Formula I wherein both $R_1$ and $R_2$ are lower alkanoyl, the starting material wherein $R_1$ and $R_2$ are hydrogen is heated with at least two equivalents of a lower alkanoic acid anhydride at 120° to 150° C. in the presence of an acid catalyst like sulfuric acid, p-toluenesulfonic acid or the like.

The compounds of Formula I form salts which are also part of this invention. The salts include acid addition salts, particularly the non-toxic physiologically acceptable acid addition salts, which are formed by reaction of the base of Formula I with the appropriate acid. Acids useful for preparing the acid addition salts include, for example, inorganic acids, such as the hydrohalic acids (e.g., hydrochloric and hydrobromic acid), sulfuric acid, nitric acid, boric acid and phosphoric acid and organic acids, such as oxalic, tartaric, maleic, fumaric, malic, citric, acetic, succinic, benzenesulfonic and toluenesulfonic acid. The acid addition salts frequently provide a convenient means for isolating the product, e.g., by precipitating the salt in an appropriate menstruum in which the salt is insoluble, then, after separation of the salt, neutralizing with a base such as barium hydroxide or sodium hydroxide, to obtain the free base of Formula I. Other salts may then be formed from the recovered base.

The novel compounds of this invention are ataractic substances particularly for the relief of anxiety. The compounds of this invention may be administered orally or parenterally to animal species, e.g., domestic and household animals as well as experimental animals, to produce relief from anxiety without inducing other central effects.

The ataractic effect may be achieved by administering a compound of Formula I or its physiologically acceptable salt orally or parenterally in a dose of about 3 to 25 mg./kg. in single or 2 to 4 divided doses per day. The anti-anxiety effect increases with an increase in dosage. Moreover, in contrast to known compounds, the higher dosage does not introduce other CNS effects, particularly depression. For example, in the test with thirsty rats, as the dose is increased from 3 mg./kg. to 25 mg./kg., the thirsty rat drinks water with greater frequency despite receiving punishment with each drink. There is no evidence of CNS depression which incapacitates the rats, so that they are unable to take water.

Tablets, capsules, elixirs, injectables and the like, incorporating about 10 mg. to about 250 mg. of the base of Formula I or a physiologically acceptable acid addition salt thereof together with carriers, excipients, lubricants, etc., according to accepted pharmaceutical practice, may be administered in single doses, or divided doses 2 to 4 times daily.

The following examples are illustrative of the invention. All temperatures are on the centigrade scale.

EXAMPLE 1

5-[3-[4-(aminomethyl)piperidino]propyl]-5,11 dihydro-7-(trifluoromethyl)dibenz[b,e][1,4]oxazepine dimaleate A mixture of 3.4 g. of 5-(3-chloropropyl)-5,11-dihydro-7-(trifluoromethyl)dibenz[b,e][1,4]oxazepine, 2.85 g. of 4-aminomethylpiperidine, 1.7 g. of sodium iodide, and 50 ml. of ethyl methyl ketone is stirred and heated under reflux for about 18 hours and then is concentrated to dryness in vacuo. The residue is distributed between 100 ml. of ether and 15 ml. of water, shaken well, the water layer separated, and the ether layer washed repeatedly with water until the washings are neutral. The ether solution is cooled and extracted with three 50 ml. portions of cold 10% hydrochloric acid. The combined acid extracts are cooled and treated with an excess of 50% aqueous sodium hydroxide and the oily base is extracted into ether. The ether extracts are washed with 25 ml. of saturated sodium chloride solution, dried and concentrated. The base distills at about 200–210° (0.05 mm.), $n_D^{27}$ 1.5485.

To the base, 2.45 g., in 20 ml. of acetonitrile is added a solution of 1.36 g. of maleic acid in 13 ml. of acetonitrile. The maleate that forms is filtered and recrystallized from acetonitrile to give the pure product, M.P. 165–167°.

EXAMPLE 2

5,11 - dihydro - 5 - [3 - [4 - (dimethylaminomethyl)-piperidino]propyl] - 7 - (trifluoromethyl)dibenz[b,e][1,4]oxazepine dihydrochloride The base, obtained as in Example 1, 4.2 g., 4.6 g. of 98–100% formic acid, and 3.0 g. of 37% formalin are heated for 8 hours in an oil bath at 90–100°. The mixture is cooled, filtered and the filtrate is treated with 10 ml. of N-hydrochloric acid. The solution is concentrated to dryness in vacuo to give 5,11-dihydro-5-[3-[4-dimethylaminomethyl)piperidino]propyl] - 7-(trifluoromethyl)dibenz[b,e][1,4]oxazepine dihydrochloride.

EXAMPLE 3

5,11 - dihydro - 5 - [3 - [2-[2-dimethylamino)ethyl]piperidino]propyl] - 7 - (trifluoromethyl)dibenz[b,e][1,4]oxazepine dimaleate Employing the procedure of Example 1, but substituting 3.26 g. of 2-(2-dimethylaminoethyl)piperidine for the 4-amino-methylpiperidine in that example, there is obtained 5,11 - dihydro-5-[3-[2-[2-(dimethylamino)ethyl]-piperidino]propyl] - 7 - (trifluoromethyl)-dibenz[b,e][1,4]oxazepine. The base, 4.60 g., in 20 ml. of acetonitrile, and 2.32 g. of maleic acid in 25 ml. of acetonitrile as in Example 1, give the dimaleate.

EXAMPLE 4

5,11 - dihydro - 5 - [3 - [2 - (ethylaminomethyl)piperidino]propyl] - 7 - (trifluoromethyl)dibenz[b,e][1,4]-oxazepine dihydrochloride (a) Employing the procedure of Example 1, but substituting 3.12 g. of 2-(ethylaminomethyl)piperidine for the 4-aminomethylpiperidine in that example, there is obtained the oily base, 5,11-dihydro-5-[3-[2-(ethylaminomethyl)piperidino]propyl] - 7 - (trifluoromethyl)dibenz-[b,e][1,4]oxazepine.

(b) The oily base obtained in (a), 2.30 g. is dissolved in 15 ml. of dry 2-propanol, cooled to 0°, and treated dropwise with an ethereal solution containing 0.73 g. of hydrogen chloride. The precipitate that separates is filtered and recrystallized from acetonitrile to give the dihydrochloride of 5,11 - dihydro - 5-[3-[2-(ethylaminomethyl)piperidino]propyl] - 7 - (trifluoromethyl)dibenz-[b,e][1,4]oxazepine.

EXAMPLE 5

5,11 - dihydro - 5 - [3-[3-(dimethylaminomethyl)piperidino]propyl] - 7 - (trifluoromethyl)dibenz[b,e][1,4]-oxazepine difumarate (a) By following the procedure of Example 1 but substituting 3.12 g. of 3-dimethylaminomethylpiperidine for the 4-aminomethylpiperidine there is obtained the base, 5,11-dihydro-5-[3-[3-(dimethylaminomethyl)piperidino]-propyl]-7-(trifluoromethyl)dibenz[b,e][1,4]oxazepine.

(b) The base, obtained in (a), 2.24 g., is dissolved in 25 ml. of acetonitrile and the solution is treated with 2.26 g. of fumaric acid in 25 ml. of acetonitrile, at the boiling point. The solutions are mixed thoroughly and allowed to cool spontaneously to room temperature, and then kept at 0° for two hours. The solid is filtered to give 5,11-dihydro-5-[3-[3-(dimethylaminomethyl)piperidino]-propyl] - 7 - (trifluoromethyl)dibenz[b,e][1,4]oxazepine difumarate.

EXAMPLE 6

5,11 - dihydro - 5 - [4 - [3 - (2-aminobutyl)piperidino]-butyl] - 7 - (trifluoromethyl)dibenz[b,e][1,4]oxazepine dihydrochloride (a) 5,11 - dihydro-5-[4'-(2''-tetrahydropyranyloxy)-1'-butyl] - 7-(trifluoromethyl)dibenz[b,e][1,4]oxazepine dihydrochloride.—A mixture of 66.3 g. of 5,11-dihydro-7-(trifluoromethyl)-dibenz[b,e][1,4]oxazepine, 50.0 g. of powdered sodium hydroxide, 58.6 g. of 2-tetrahydropyranyl-4-chlorobutyl ether, and 250 ml. of ethyl methyl ketone are stirred and heated under reflux for about 18 hours, cooled, and treated with 200 ml. of cold water. The ethyl methyl ketone layer is separated, the water layer is extracted with two 50 ml. portions of ethyl methyl ketone. The combined ethyl methyl ketone solutions are washed with 25 ml. of saturated aqueous sodium chloride solution, dried, and concentrated. The residue is distilled to give 84.8 g. of product, B.P. 210–212° (0.1 mm.).

(b) 5,11 - dihydro - 5-(4-hydroxybutyl)-7-(trifluoromethyl)dibenz[b,e][1,4]oxazepine.—A solution of the product from (a), 84.0 g., 25 ml. of concentrated hydrochloric acid, and 1 l. of 75% ethanol is heated under reflux for 1 hour, and the ethanol distilled by means of a steam bath. The residual mixture is cooled, extracted with 3× 100 ml. of ether. The combined ether extracts are washed with saturated aqueous sodium chloride solution, dried, and concentrated to give 5,11-dihydro-5-(4-hydroxybutyl) - 7 - (trifluoromethyl)dibenz[b,e][1,4]-oxazepine, B.P. 185–187° (0.2 mm.).

(c) 5 - (4 - chlorobutyl) - 5,11-dihydro-7-(trifluoromethyl)dibenz[b,e][1,4]oxazepine.—The product from (b), 67.4 g., in 500 ml. of dry benzene is treated dropwise with 24.0 g. of thionyl chloride. Subsequently, the mixture is heated under reflux for 1 hour, poured into 100 ml. of ice-water, the benzene layer separated, washed with 25 ml. of saturated sodium chloride solution, dried, and concentrated to give 5 - (4-chlorobutyl)-5,11-dihydro-7-(trifluoromethyl)dibenz[b,e][1,4]oxazepine.

(d) 5,11 - dihydro-5-[4-[3-(2-aminobutyl)piperidino]-butyl] - 7-(trifluoromethyl)dibenz[b,e][1,4]oxazepine dihydrochloride.—The product from (c), 3.60 g., of (2-aminobutyl)piperidine, 3.0 g. of sodium iodide and 100 ml. of ethyl methyl ketone are stirred and heated under reflux for about 18 hours and then treated as in Example 1 to give the base, 5,11-dihydro-5-[4-[3-(2-aminobutyl)-piperidino]butyl] - 7-(trifluoromethyl)dibenz[b,e][1,4]-oxazepine.

The base, 4.62 g., in 50 ml. of dry ether is cooled to 0° and treated with a dry ether solution containing 0.74 g. of hydrogen chloride to give the product, 5,11-dihydro-5 - [4 - [3-(2-aminobutyl)piperidino]butyl]-7-(trifluoromethyl)dibenz[b,e][1,4]oxazepine dihydrochloride.

EXAMPLE 7

2-[2-[2-(dimethylamino)ethyl]piperidino]ethyl chloride hydrobromide

To a solution of 143.5 g. of ethylene bromochloride in 500 ml. of methylene chloride, at 0°, is added slowly 157.0 g. of 2-(2-dimethylaminoethyl)piperidine. Subsequent to the addition, the mixture is stirred while the temperature is allowed to rise to room temperature, spontaneously. The crystalline 2 - [2-[2-(dimethylamino)ethyl]-piperidino]ethyl chloride hydrobromide is filtered and dried in vacuo.

EXAMPLE 8

3 - chloro-5,11-dihydro - 5 - [2-[2-[2-(dimethylamino) ethyl]piperidino] - ethyl] - 7 - (trifluoromethyl)dibenz [b,e][1,4]oxazepine difumarate (a) 3 - chloro-5,11-dihydro-7-(trifluoromethyl)dibenz-[b,e][1,4]oxazepine.—To 265.0 g. of α,α,α-trifluoro-6'-hydroxy-m-formotoluidide, 380.0 g. of 4-chloro-2-bromobenzyl bromide, and 2600 ml. of absolute ethanol is added dropwise 69.8 g. of sodium methoxide in 750 ml. of absolute ethanol. Workup of the reaction mixture gives 586.0 g. of 6'-[(4'-chloro-2-bromobenzyl)oxyl]-α,α,α-trifluoro-m-formotoluidide. The formotoluidide, 254.3 g., 1960 ml. of N,N-dimethylformamide, 164.0 g. of potassium carbonate, and 14.0 g. of copper bronze are heated for 3.5 hours, filtered, and the filtrate concentrated to give 160.2 g. of 3-chloro-5,11-dihydro-7-(trifluoromethyl)dibenz-[b,e][1,4]oxazepine - 5 - carboxaldehyde. The carboxaldehyde derivative, 158.0 g., 1560 ml. of 95% ethanol, and 312 ml. of 25% aqueous sodium hydroxide are heated under reflux and then concentrated to give 3-chloro - 5,11 - dihydro - 7 - (trifluoromethyl)dibenz[b,e] [1,4]oxazepine.

(b) 3-chloro-5,11-dihydro-5-[2-[2-[2-(dimethylamino) ethyl]piperidino] - 7 - (trifluoromethyl)dibenz[b,e][1,4] oxazepine difumarate.—To 30.1 g. of the product from (a), 120.0 g. of 2-[(2-dimethylaminoethyl)piperidino] ethyl chloride hydrobromide, and 625 ml. of ethyl methyl ketone is added 90.0 g. of granular sodium hydroxide and the mixture stirred vigorously and heated under reflux for 3 hours, then cooled, treated with 400 ml. of cold water, the ethyl methyl ketone layer separated, washed with water, then saturated aqueous sodium chloride, dried, and concentrated. The residue is dissolved in 1 l. of ether, and the ether solution is cooled and extracted successively with three 200 ml. portions of cold 10% hydrochloric acid. The acid extracts are cooled, treated with an excess of 50% aqueous sodium hydroxide, and the base isolated by ether extraction. The base, 48.7 g., is dissolved in 490 ml. of acetonitrile at the boiling point, and to this solution is added rapidly a hot solution of 23.2 g. of fumaric acid in 250 ml. of acetonitrile. The solutions are mixed thoroughly, allowed to cool, and finally refrigerated. The crystalline product is filtered to give 3-chloro-5,11-dihydro-5-[2-[2-[2-(dimethylamino)ethyl]piperidino]ethyl] - 7 - trifluoromethyl)dibenz[b,e][1,4]oxazepine difumarate.

EXAMPLE 9

4-chloro-2-bromobenzyl bromide

To 508.0 g. of p-chlorotoluene and 50 g. of powdered iron at 25–30° is added 880.0 g. of bromine and the reaction worked up to give 2-bromo-p-chlorotoluene, B.P. 105–110° (3 mm.), $n_D^{23}$ 1.5731. To 453.0 g. of 2-bromo-p-chlorotoluene and 3.0 g. of benzoyl peroxide at 120° while irradiated with an ultraviolet lamp is added 360.0 g. of bromine to give 2-bromo-4-chlorobenzyl bromide, $n_D^{25}$ 1.6215.

EXAMPLE 10

N-[[1-[3-[5,11-dihydro-7-(trifluoromethyl) - dibenz[b,e][1,4]oxazepin - 5 - yl]propyl]-2-piperidyl]methyl]-N-ethylheptanamide hydrochloride The product prepared in Example 4, 4.47 g., is dissolved in 50 ml. of dry benzene, the solution is cooled to 5°, and treated dropwise with a solution of 1.63 g. of heptanoyl chloride in 10 ml. of dry benzene. Subsequently, the mixture is allowed to warm to room temperature and then gradually warmed to 60°. Following a two hour heating period at 60°, the mixture is cooled to 0° and filtered to give N-[[1-[3-[5,11-dihydro-7-trifloromethyl)-dibenz[b,e][1,4]oxazepin - 5 - yl]propyl]-2-piperidyl]methyl]-N-ethylheptanamide hydrochloride.

What is claimed is:
1. A compound of the formula

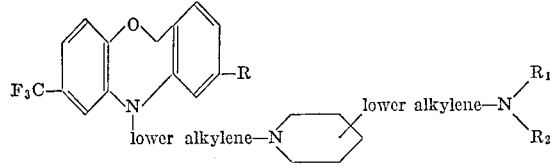

wherein R is hydrogen or halogen and $R_1$ and $R_2$ each is hydrogen, lower alkyl or alkanoyl of up to eleven carbons, or an acid addition salt thereof.

2. A compound of the formula

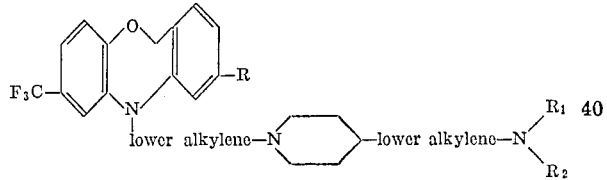

wherein R, $R_1$ and $R_2$ have the same meaning as in claim 1.

3. A compound as in claim 1 wherein R is hydrogen.
4. A compound as in claim 2 wherein each lower alkylene group has up to four carbon atoms.
5. A compound as in claim 2 wherein R, $R_1$ and $R_2$ each is hydrogen.
6. A compound as in claim 2 wherein R is hydrogen, $R_1$ and $R_2$ each is methyl, the lower alkylene group joining the two nitrogen atoms has three carbons and the other lower alkylene group has one carbon.
7. A compound as in claim 2 wherein R and $R_1$ each is hydrogen, $R_2$ is ethyl, the lower alkylene group joining the two nitrogen atoms has three carbons and the other lower alkylene group has one carbon.
8. A compound of the formula

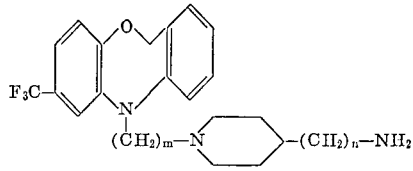

wherein $m$ and $n$ each is 1, 2 or 3.

9. A compound as in claim 8 wherein $m$ is 3 and $n$ is 1.
10. A compound as in claim 2 wherein R is hydrogen, $R_1$ is ethyl, $R_2$ is heptanoyl, the lower alkylene group joining the two nitrogen atoms has three carbons and the other lower alkylene group has one carbon.

References Cited

UNITED STATES PATENTS 3,069,432   12/1962   Yale et al. _____ 260—294.7 C

S. D. WINTERS, Assistant Examiner

U.S. Cl. X.R.

260—333; 424—267